United States Patent [19]

van Dijk et al.

[11] Patent Number: 4,769,140

[45] Date of Patent: Sep. 6, 1988

[54] APPARATUS FOR THE SEPARATION OF MIXTURES BY MEANS OF PERVAPORATION

[75] Inventors: Arnold J. van Dijk, Uithoorn, Netherlands; Hartmut E. A. Brueschke, Nussloch; Walter Schneider, Dossenheim, both of Fed. Rep. of Germany; George Schroeder, Voorschoten, Netherlands; Guenter F. Tusel, Homburg/Saar, Fed. Rep. of Germany; Frans D. van Wijck, Leiderdorp, Netherlands

[73] Assignee: GFT-Ingenieurbuero für Industrieanlagenplanung, Fed. Rep. of Germany

[21] Appl. No.: 896,099

[22] Filed: Aug. 13, 1986

[30] Foreign Application Priority Data

Aug. 14, 1985 [DE] Fed. Rep. of Germany ....... 3529175

[51] Int. Cl.$^4$ ............................................. B01D 13/00
[52] U.S. Cl. .................................. 210/184; 210/321.75
[58] Field of Search .................... 210/184, 321.1, 335, 210/340, 433.2, 450, 321.75, 343, 344, 346; 55/158

[56] References Cited

U.S. PATENT DOCUMENTS

| 2,958,656 | 11/1960 | Stuckey | 210/655 |
| 2,958,657 | 11/1960 | Binning et al. | 210/655 |
| 3,140,256 | 7/1964 | Martin et al. | 210/506 X |
| 3,182,043 | 5/1965 | Kirkland | 210/640 |
| 3,367,787 | 2/1968 | Thijssen et al. | 159/13.4 X |
| 3,520,803 | 7/1970 | Iaconelli | 210/640 |
| 3,854,904 | 12/1974 | Jamet | 210/346 |
| 4,430,218 | 2/1984 | Perl et al. | 210/433.2 |

FOREIGN PATENT DOCUMENTS

| 0096340 | 5/1983 | Fed. Rep. of Germany . |
| 3304956 | 8/1984 | Fed. Rep. of Germany . |
| 8422012 | 10/1984 | Fed. Rep. of Germany . |
| 3410155 | 8/1985 | Fed. Rep. of Germany . |

OTHER PUBLICATIONS

Porter, M. C. et al., *Membrane Ultrafiltration*, Chem. Tech., Jan. 1971, pp. 56–63.

Primary Examiner—Frank Spear
Attorney, Agent, or Firm—Foley & Lardner, Schwartz, Jeffery, Schwaab, Mack, Blumenthal & Evans

[57] ABSTRACT

An apparatus for membrane pervaporation, in which a raw feed chamber, constituting two partial chambers, is formed by two plates. On the respective sides of each plate which are faced away from each other, there is a surrounding profile, which serves as support for the membrane. A surrounding gasket is arranged between the respective plate and the membrane such that the compaction of the gasket is limited to a predetermined value. Several raw feed chambers and permeate chambers can be alternately arranged in a stack unit. The apparatus is characterized by a simple design and low number of elements.

22 Claims, 4 Drawing Sheets

APPARATUS FOR THE SEPARATION OF MIXTURES BY MEANS OF PERVAPORATION

BACKGROUND OF THE INVENTION

The present invention concerns an apparatus for the arrangement of membranes in a module and, in particular, a plate module for the separation of mixtures by a pervaporation process.

Separation processes using membranes are, today, implemented on a large scale in many technical fields, such as sea and brackish water desalination, treatment of process solutions and for ultrafiltration. In other fields, however, such as for gas separation and the separation of organic liquid mixtures, the implementation of membranes is in its early stages. The latter process, the separation of organic liquid mixtures by means of membranes, is known as pervaporation and it differs from other membrane processes in particular through the formation of vaporous permeate.

Pervaporation is, more specifically, a separation process in which a liquid feed mixture to be separated is brought into contact with a first or feed side of a suitable membrane. If, at the second or permeate side of the membrane, the partial vapor pressures of the components of the liquid feed mixture are kept below the partial vapor pressures of the components at the feed side, a driving force for the migration of these components through the membrane is established. According to their respective permeabilities in the membrane, the components of the feed mixture pass through the membrane at different rates; in fact, permeation rates are complex functions of a number of different parameters, including the nature and concentration of the permeating species, the constituency and structure of the membrane, the composition of the mixture, temperature, and others. Since the partial vapor pressures are lower at the permeate side than at the feed side of the membrane, the components evaporate after passing through the membrane, forming a vaporous permeate (hence the term "pervaporation"). Due to the differing permeabilities of the feed-mixture components, the composition of the permeate differs from that of the feed mixture, and a separation of the feed mixture is observed.

If a sufficiently high difference in partial vapor pressures is maintained between the feed side and the permeate side, the separation capacity of a given membrane vis-a-vis a given feed mixture is determined only by the permeabilities of the respective components. Only nonporous membranes can be used for pervaporation, and it is believed that the solubility of a component in the membrane material, together with diffusivities, governs mass transport across the membrane. Thus, pervaporation must not be mistaken for membrane distillation. The latter is a normal distillation process, using porous membranes, and separation follows thermodynamic vapor-liquid equilibria. By contrast, pervaporation is a nonequilibrium dynamic process, where transport phenomena determine separation efficiency.

With pervaporation, as with the other membrane separation processes, the mixture to be separated is brought into contact with one side of a suitable membrane. But the differences in the chemical potentials of the mixture components on both sides of the membrane which are necessary for permeation, and thus separation, are not created in the case of pervaporation, by an increase in pressure (and consequent increasing of the chemical potential) on the mixture side as with other membrane processes, but by a lowering of the chemical potentials on the permeate side. This is most simply achieved through the creation of a vacuum on the permeate side, such that the partial pressures of all components are decreased on the permeate side of the membrane to levels below the corresponding partial pressures on the mixture side. Constant pumping off of the components passing through the membrane in a vaporous form or their condensation in a vacuum, enables constant maintaining of a sufficiently large difference in the partial pressure on both sides of the membrane. Obviously, only those components of a mixture which possess a sufficiently high volatility can permeate through a pervaporation membrane.

For pervaporation processes, as indicated above, poreless membranes are used. The varying permeation rates of the components of the mixture to be separated is the sole factor which determines the separation effectiveness of the pervaporation process. No thermodynamic equilibrium is established between the two sides of the membrane. The selectivity and the extent of the achievable separation are solely determined by the transport characteristics of the membrane. Accordingly, mixtures such as azeotropes can be effectively separated, which is not possible utilizing thermodynamic vapor-liquid equilibria.

The literature provides the expert in the field with descriptions of modules that have been proposed for implementing pervaporation processes (e.g., Stuckey, U.S. Pat. No. 2,958,656; Stuckey, U.S. Pat. No. 2,958,657; Kirkland, U.S. Pat. No. 3,182,043; Thijsen et al, U.S. Pat. No. 3,367,787; Martin et al, U.S. Pat. No. 3,140,256). Modules in accordance with these proposals, as well as attempts to use modules like those successfully employed in reverse osmosis and ultrafiltration processes, have not been successful, however, and have failed to lead to industrial implementation of pervaporation processes. None of these modules meets the specific requirements and particularities of the pervaporation process sufficiently to enable economic implementation thereof.

The arrangement of hollow fiber membranes in a bundle is not successful in the case of pervaporation, since the loss in pressure of the vapor on the permeate side in the narrow inner holes of a hollow fiber rapidly exceeds a tolerable level. Pressure loss calculations show that, with the implementation of normal hollow fibers for pervaporation, a fiber length of 20 cm should not be much exceeded, in order to enable successful execution of the pervaporation process, provided that all other conditions are also favorable.

For the same reasons, the normal spiral-wound module, where the permeate, after passing through the membrane, flows spirally through a narrow, pressure-proofed channel to a permeate collection pipe, cannot be used for pervaporation.

European Patent Application No. 0 096 340, however, describes a module with a spirally-wound membrane, in which, contrary to the conventional spiral wound modules, the flow direction and channels for the raw feed and the permeate are reversed, so that the permeate, after passing through the membrane, has to travel, at most, a distance of half a module length in an open channel before leaving the module. Such a module can be used successfully for pervaporation.

Due to their simple construction and the possibility of also implementing small-surface membranes in them, plate modules play a considerable role in membrane technology. Thus, West German Offenlegungsschrift No. 3 304 956 describes a plate module for pervaporation which is constructed to achieve an alignment of heat chambers, raw feed chambers and permeate chambers. The heating of each raw feed chamber is devised to maintain a constant operating temperature throughout the module and to replace immediately heat losses caused by the pervaporation process. The trans-membrane flow of a pervaporation membrane doubles on the one hand, with a temperature increase of approximately 10° K, while the vaporizing permeate, on the other hand, withdraws heat from the system and, thereby, from the raw feed.

However, the additional expenditure in material for the heating chamber, the reduced packing density and the necessity of additional sealing off of the raw feed chambers against the heat chambers, along with the resulting additional sources for defects and leaks, are not offset, relative to the available membrane surface, by the slightly increased average flow.

Furthermore, according to West German Offenlegungsschrift No. 3 304 956 the permeate vapor is first directed from the individual permeate chambers through special channels within the closed module. This means that considerable pressure losses on the permeate side have to be tolerated, which greatly limits the implementation possibilities of such a module, or that only small module units with smaller membrane surface and enlarged permeate channels can be used, whereby the global packing density is again reduced and the module becomes much more costly.

DISCLOSURE OF THE INVENTION

It is therefore an object of the invention to provide an apparatus for pervaporation having a low pressure drop from a feed side to a permeate side.

It is another object of the invention to provide a pervaporation apparatus that eliminates the need for special chambers for direction of permeate flow from the apparatus.

It is yet another object of the invention to provide an apparatus for pervaporation that can be formed into modules having large membrane surface areas.

It is still another object of the invention to provide an pervaporation apparatus that has a high packing density of membranes.

An apparatus for the separation of components of a mixture by pervaporation, comprising a raw feed chamber, a permeate chamber and a membrane arranged between these chambers, and further comprising means for feeding the mixture into the raw feed chamber and means for removing the mixture from the raw feed chamber, wherein (A) the apparatus comprises two plates, each having a feed side and a membrane side; (B) both plates are arranged with their feed sides facing each other; (C) each plate has a surrounding profile on its membrane side; (D) the membrane is arranged on the surrounding profile; and (E) on the membrane side of the plate, but recessed from the support of the membrane, a surrounding sealing means is provided in sealing engagement between the plate and the membrane, the raw feed chamber being comprised of two partial chambers, each defined by a respective plate, membrane and surrounding sealing means.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a complete understanding of the invention, the specification should be read in conjunction with the drawings, wherein.

DETAILED DESCRIPTION OF THE PREFERRED EMBODIMENTS

The present invention relates to a pervaporation apparatus having a particular structure and arrangement of the raw feed chambers and permeate chambers, as well as raw feed and permeate channels and the membrane, to create a module. Experts in the field of separation processes are acquainted with various pervaporation membranes, which can be used according to the present invention in an apparatus for the separation of water from mixtures with organic liquids, for the separation of volatile organic compounds from aqueous solutions, for the separation of mixtures from organic components or for separation of at least one volatile component from a mixture with at least one nonvolatile component. The present invention thus avoids the mistakes of earlier proposals and fulfills the specific requirements imposed on a module by the pervaporation process.

Figure 1:
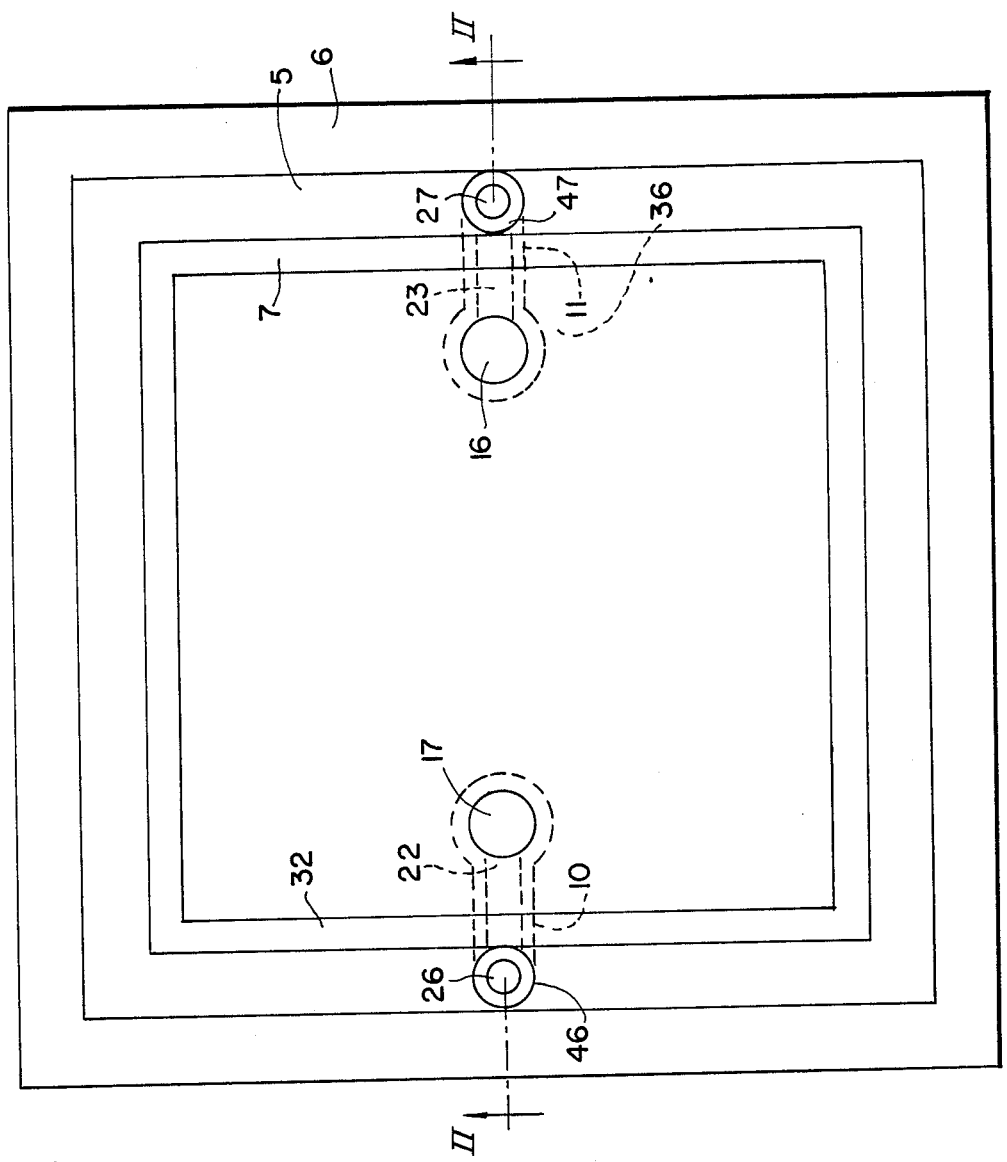
FIG. 1 is a top view of a plate of the pervaporation apparatus of the present invention.
Figure 2:
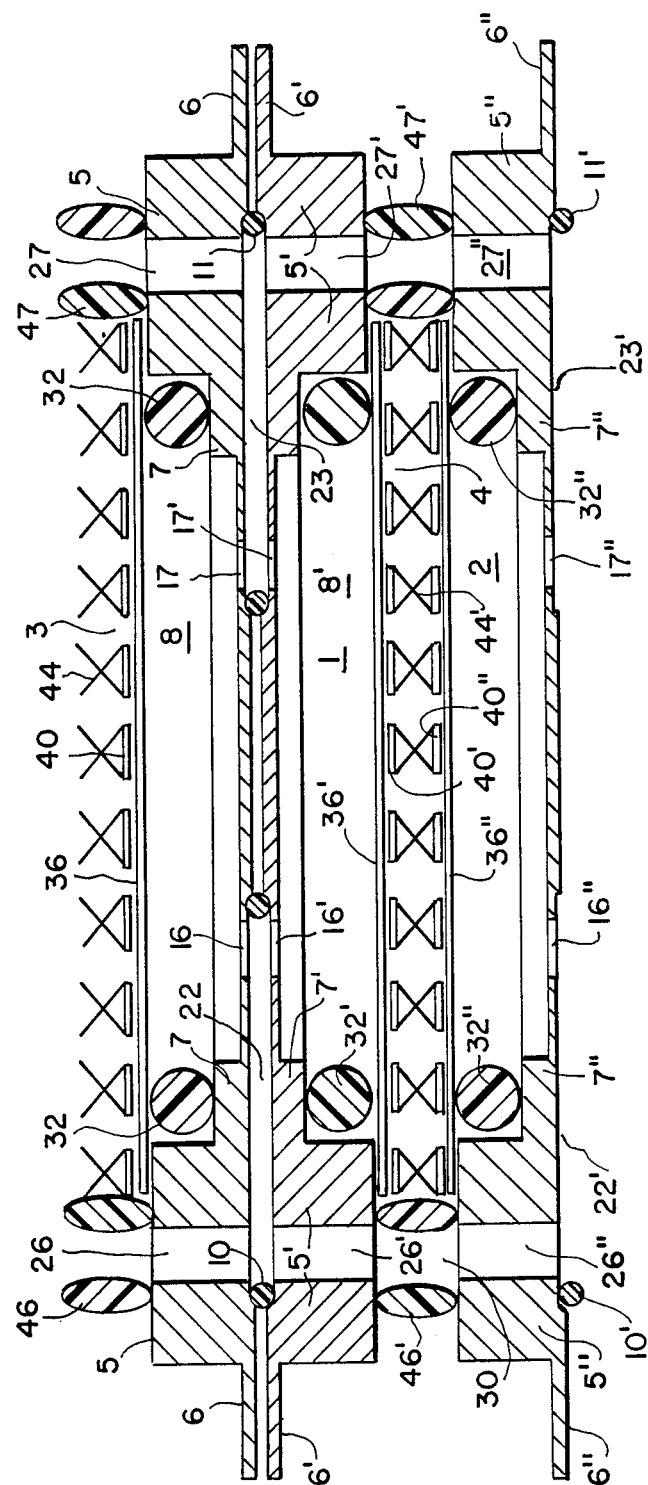
FIG. 2 is a cross-sectional view along lines II—II of FIG. 1 showing a module of the invention.

FIG. 1 shows the top view of a plate 6, which is characterized by a circumferential raised double-profile on one of its surfaces, with a higher outer step 5 and a lower inner step 7. On the inner lower profile step 7 a surrounding gasket 32 is also laid, and on this is placed a membrane 36 with its active separating layer facing plate 6. Within the area circumscribed by gasket 32, plate 6 possesses perforations 16 and 17, which are opposite each other. As shown in FIG. 2, a second plate 6', which preferably has a configuration identical to that of plate 6, is positioned adjacent plate 6 in opposing mirrorimage relationship. The various elements of the two plates are substantially the same, with those of plate 6' being designated by the prime symbol in FIGS. 1 and 2.

On the respective surfaces of the plates 6 and 6' which face away from the raised profile 5,7 and 5',7', the plates 6 and 6' possess deepened channels 22,23 defined between holes 16,26 and 17,27 in plate 6, and holes 16',26' and 17',27' in plate 6'. Holes 26,26' and 27,27' form feed inlet and product outlet channels, respectively. The deepened channels 22,23 lie vertically to the main axis of the plates 6,6', opposite the higher profile 5,5'. Gaskets 10,11 tightly seal the channels 22,23 if the two plates 6,6' are laid on top of each other on the sides without raised profiles. FIG. 2 also illustrates a plate 6" facing plate 6'. In this arrangement, gaskets 46',47' form tightly sealed feed and product channels 26',26" and 27',27".

Raw feed chambers 1,2 and permeate chambers 3,4 alternately form a module. The raw feed chambers 1,2 are formed by the plates 6,6',6", which lie pair-wise on top of each other on their non-raised profile side, whereby the inner holes 16,16', 16" and 17,17', 17" also lie pair-wise on top of each other. On top of the gaskets 32,32', 32", which lie respectively on the inner profile steps 7,7', 7", are positioned the membranes 36,36',36" with their active separating layers facing the respective gaskets 32,32',32" and the plates 6,6',6". The raw feed chamber 1 is defined by the two plates 6,6', their surrounding profiles 7,7' and 5,5', and the membranes 36,36', the chamber being sealed by the gaskets 32,32'. This raw feed chamber comprises two feed spaces 8,8', connected by the holes 16,16' and 17,17'. The raw feed chamber is connected to the inlet hole 26 and outlet hole 27 by the channels 22,23 and can be fed with the raw feed in a flow parallel to the other raw feed chambers of a module.

The reverse sides of the membranes 36,36',36" lie on perforated plates 40,40',40", which are kept at a defined distance by spacers 44,44' and which, together with the spacers, define the permeate chambers 3,4. The spacers preferably have a large amount of open area along their surfaces. The permeate chambers 3,4 are bounded on their upper and lower surface by the perforated plates. They are completely open on at least the two sides A and B (FIG. 1) and can be partly open at the sides C and D where the inlet and outlet holes 26 and 27 for the raw feed product are located. Preferably at least three sides are open. The periodical arrangement of raw feed chambers in accordance with FIG. 2 can be continued as required. At each end of such a stack of modules there is a permeate chamber, the respective surface of which is bounded by a terminal flange. The whole module stack is held together by the terminal flange and interpositioned tie bolts (omitted from FIG. 2 for simplification) which create the tensile force necessary for the deformation and effectiveness of the gaskets.

Figure 3:
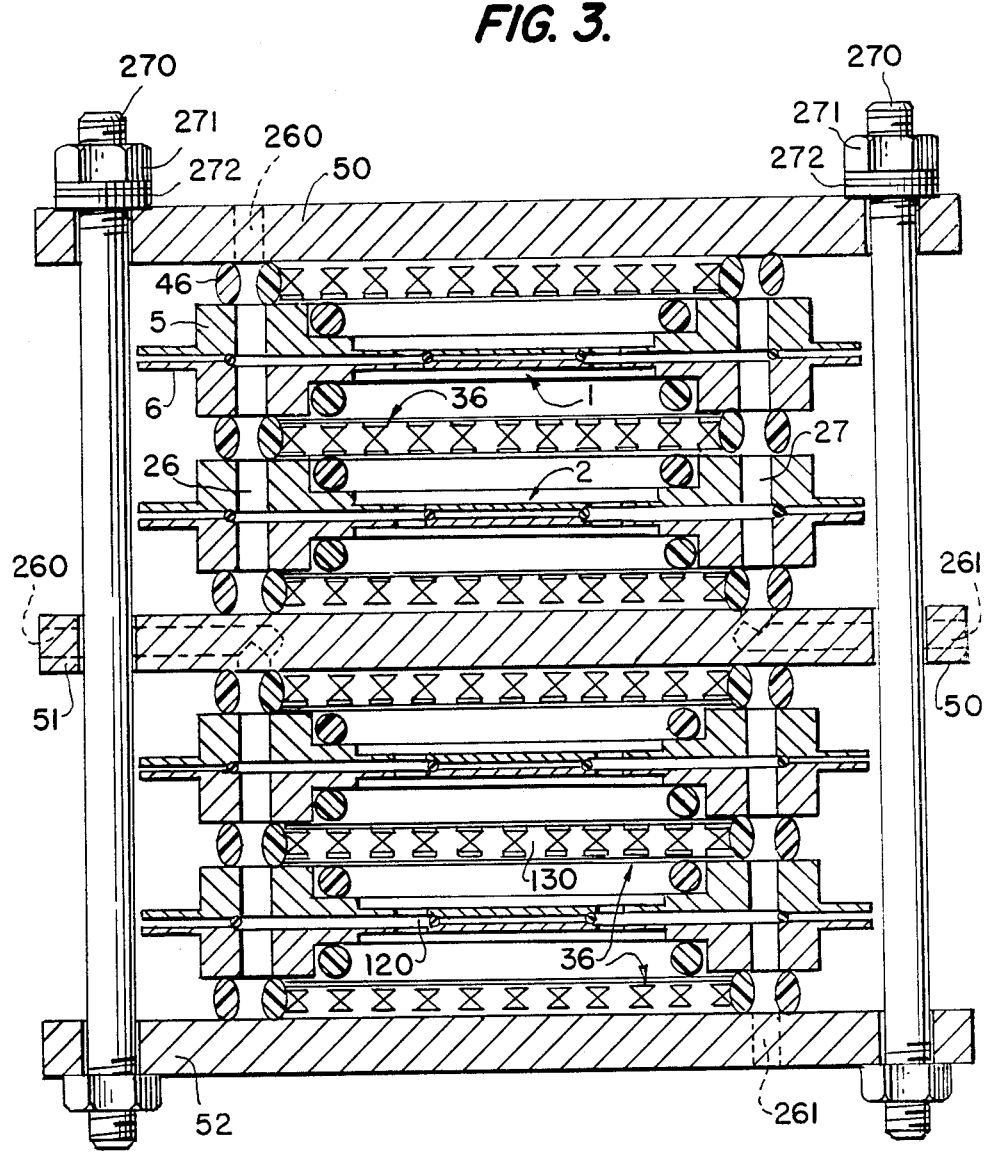
FIG. 3 shows schematically an assembled unit of a plurality of the separation modules. The modules, comprising raw feed chambers 1 and 2, are the same as those shown in FIG. 2.

Each module stack possesses a joint raw feed inlet 26 and a joint raw feed product outlet 27 for all raw feed chambers. As shown in FIG. 3, each module unit comprises two plates 6, 6' arranged in mirror module image form. Each plate has a surrounding profile 5 with raw feed inlet and outlet channels 26 and 27. The individual channels 26 and 27 form a complete inlet or outlet channel, respectively. The inlet channel is connected via a hole 260 in a plate 50 or 51, respectively. These holes form the product inlet for the assembled unit. The permeate, i.e., the product that has passed through the membrane 36, leaves the individual units sidewise. With particuar reference to FIG. 1, attention is drawn to the fact that the sealing 46 is only sealing the space surrounding the holes 26. The outlet holes 27 of each unit are interconnected to form an outlet channel. This outlet channel is connected via an opening 261 in the middle flange 51 or, respectively, in the end plate or end flange 52 to conduits (not shown) for further processing.

The module units are held together between middle flange 51 and end plates 50, 52. The plates are forced together, pressing the plates 6, 6' into sealing engagement with the seals surrounding holes 26, 27, and with the seals surrounding the inlet and the outlet opening to and from feed chambers 1 and 2 by tie bolts 270 with nuts 271 and spring washers 272. The feed space or feed chamber 120 and the permeate space or permeate chamber 130 are separated from each other by membranes 36.

Figure 4:
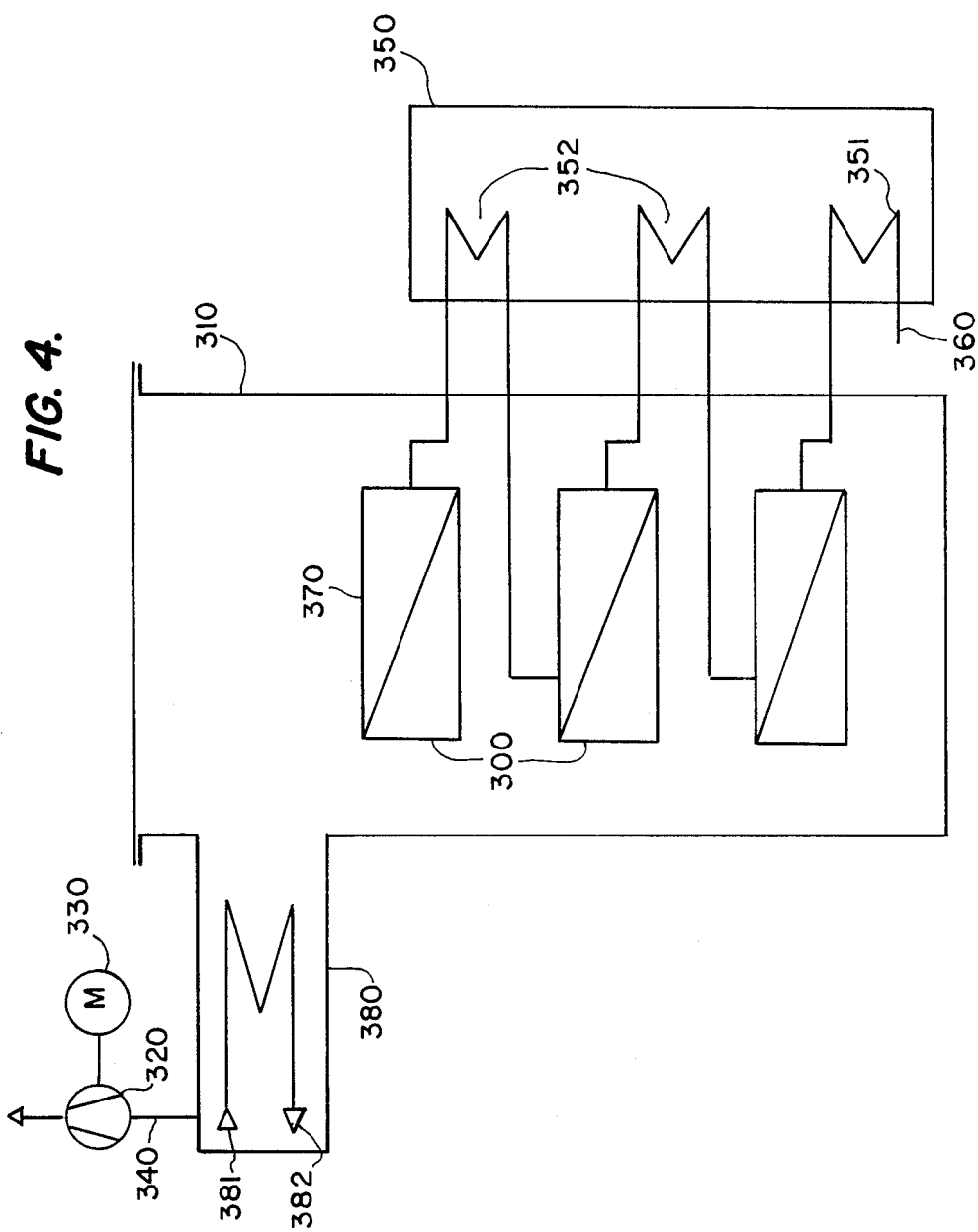
FIG. 4 depicts a schematic arrangement of a plurality of separation modules, such as those shown in FIG. 3.

As shown in FIG. 4, the individual modules are arranged in the depicted, exemplary embodiment in a vacuum vessel 310, which is connected to a vacuum pump 320 driven by a motor 330 via a conduit 340. The feed enters a heat-exchanger 350 via line 360. The heat exchanger comprises a pre-heater 351 and intermediate heat exchangers 352. The product leaves the system via conduit 370. The permeate entering the vacuum vessel 310, e.g., in vapor form, is condensed in a condenser 380 which is cooled by a coolant entering the condenser via conduit 381 and leaving the condenser via conduit 382.

For the execution of a pervaporation process, a module stack according to the present invention, equipped with inlet and outlet for the raw feed, is placed in a vacuum vessel that contains a suitably cooled condenser which condenses the vaporous permeate. Due to the permeate chambers being open at the sides and through the arrangement of the module (in accordance with the invention) in a vacuum vessel, a quick discharge of the vaporous permeate from the reverse side of the membrane is ensured.

The maximum distance to be covered by the permeate vapor prior to discharge from the module corresponds to half the width of a module chamber. Because of this, and due to the geometric form of the permeate and raw feed chambers and to the dimensioning of the spacing devices which define the sizes of the permeate chambers, it can be ensured that, for all operational conditions which can prevail in a pervaporation process, the losses in pressure between the reverse side of a membrane and the discharge of the permeate from the module are kept at an acceptable minimum.

From this description of the invention, one skilled in the art will realize that, besides the square form for the raw feed and permeate chambers, other forms can also be selected. The same applies to the number of feed and product channels for the raw feed as well as the holes in the plates and the number of channels between two plates, which can be increased and, as with the number and form of the profiles, adapted to the respective pervaporation process.

In a preferred design the profile-bordered plates which form the raw feed chambers are not held together by the contact pressure of the terminal flange, but are kept together in pairs by means of methods well-known to the expert such as welding, riveting, pasting together or crimping.

In a further preferred design the profile-bordered plates which form the raw feed chambers, the perforated plates which bound the permeate chambers, and the spacers in the permeate chambers are made of a synthetic material. The expert in this field is acquainted with a series of synthetics which are sufficiently resistant to the operational conditions which prevail in a pervaporation process (pressure, temperature, aggressiveness of solutions) to be useful in this context.

In a further preferred design the profile-bordered plates which form the raw feed chambers, the perforated plates which bound the permeate chambers, and the spacers in the permeate chambers are made of metal. The expert can select metals suitable for even the most extreme operating conditions (e.g., special steel, titanium).

In a further preferred design the profile-bordered plates which form the raw feed chambers are formed out of thin metal sheets by deep drawing, compression or other methods known to the expert.

In a further preferred design a net or grid of metal or synthetic material is used as the component which defines the permeate chamber and functions as the spacers for the perforated plates. This net or grid possesses a sufficiently large, free section for the outlet of the permeate vapor.

In a further preferred design the perforated plates which bound the permeate chambers possess a profile on their surface which faces away from the membrane. The profiles of two plates are laid on top of each other in such a way that throughchannels are formed between them which possess a sufficiently large section for the transport of the permeate vapor.

In a further preferred design, several modules in accordance with the present invention are placed together in a vacuum vessel, and the inlets and outlets of the individual modules are joined up in such a way that the modules are passed one after the other, parallel to each other, or in any serial or parallel combination. After being discharged from one module and prior to entry into the next, the raw feed flows through a directly or indirectly heated heat exchanger, in order to regain heat lost in one module during the pervaporation process.

In a further preferred design, the heat exchangers for the re-heating of the raw feed are integrated in one of the terminal flanges of each respective module.

As can be seen from the above description, the design of a module according to the present invention and the arrangement of the membranes in it meet all the specific requirements of a pervaporation process and are characterized, in particular, by the following special features:

Formation of the raw feed chamber by two plates, between which the raw feed enters and is discharged via separate channels.

The positioning of the membrane and gasket for the raw feed chambers on profile steps. This means that a defined feed space on the raw feed side can be kept open without any additional nets, etc.

The profile step between membrane and gasket support prevents the deformation of the gasket beyond a set limit and also displacement of the gasket due to the higher inner pressure on the raw feed side in comparison to that of the vacuum permeate space.

Short permeate channels, the height of which can be easily adapted to suit the requirements of the respective pervaporation process.

Due to the installation of the modules in vacuum vessels, pressure losses between the reverse side of the membrane and the vacuum pump (condenser) can be kept at a required minimum.

High packing density, simple module design and only minimal loss in pressure on the raw feed side due to the parallel operation of the raw feed chambers in a module.

What is claimed is:

1. An apparatus for the separation of components of a fluid mixture by pervaporation, comprising at least one unit comprised of
(A) a first plate and a second plate, each of said plates presenting a membrane surface (i) and a feed surface (ii), respectively, and defining at least one first opening and one second opening, wherein each membrane surface (i) of said plates provides a recess;
(B) two membranes, each of said membranes having an active surface and a nonactive surface, wherein the active surfaces of said membranes face, and are sealingly engaged to, a membrane surface (i) of said first and second plates, respectively;
(C) at least one spacer element through which a fluid can flow, said spacer element contacting a nonactive surface of one of said membranes;
(D) means for juxtaposing feed surfaces (ii) of said first and second plates, respectively, such that a space provided between the juxtaposed feed surfaces (ii) is divided into separated first portion and second portion;
(E) means for introducing a fluid into said first portion; and
(F) means for withdrawing fluid from said second portion, wherein said recess of each of said first plate and said second plate, together with a membrane (B), defines a first feed space and a second feed space, respectively, said two feed spaces together forming a raw feed chamber that communicates, via said first opening, with said first portion and, via said second opening, with said second portion, such that raw feed fluid introduced by means (E) into said first portion can flow through said raw feed chamber to said means (F).

2. An apparatus as claimed in claim 1, wherein said spacer element defines a permeate space that is open on at least three sides.

3. An apparatus as claimed in claim 2, wherein said first and second plates are secured together by holding means.

4. An apparatus as claimed in claim 3, wherein said holding means includes terminal flanges and tie bolts which secure said raw feed chamber, thereby forming a module.

5. An apparatus as claimed in claim 4, further comprising means for applying a vacuum to the nonactive surface of each of said members.

6. An apparatus as claimed in claim 5, wherein said vacuum applying means includes a vacuum vessel within which said module is positioned.

7. An apparatus as claimed in claim 6, wherein a plurality of said modules are arranged together in series in said vacuum vessel, and wherein said apparatus includes means for heating a product from one said module prior to feeding it to another said module.

8. An apparatus as claimed in claim 6, wherein a plurality of said modules are arranged together in parallel in said vacuum vessel, and wherein said apparatus includes means for heating said raw feed fluid prior to feeding it to said modules.

9. An apparatus as claimed in claim 8, wherein said apparatus includes heating means integrated into said terminal flanges of each said module.

10. An apparatus as claimed in claim 8, wherein said heating means comprises a heat exchanger.

11. An apparatus as claimed in claim 1, wherein said separating means comprises a net having a high amount of open area across a surface.

12. An apparatus as claimed in claim 11, wherein said perforated plates define a plurality of channels for the outlet of components of a fluid mixture that pass through said membranes.

13. An apparatus as claimed in claim 1, wherein said first and second plates comprise synthetic material.

14. An apparatus as claimed in claim 1, wherein said first and second plates comprise formed metal sheet.

15. An apparatus as claimed in claim 1, wherein said first and second plates are tightly joined together.

16. An apparatus as claimed in claim 15, wherein said first and second plates are joined together by riveting, welding, bonding or crimping.

17. An apparatus as claimed in claim 11, wherein each of said first and second plates has a membrane surface (i) having a profile that engages a gasket, said gasket extending around the periphery of a membrane surface (i) and providing a seal between a membrane surface (i) of each of said plates and the active surface of a membrane (B).

18. An apparatus as claimed in claim 17, wherein each of said means (E) and means (F) comprises a conduit, each of said conduits defined by alignment of said profile on the membrane surface (i) of said first plate with said profile on the membrane surface (i) of said second plate, wherein each profile borders an aperture in a plate and wherein sealing means seal each of said conduits from spacer element (C).

19. An apparatus as claimed in claim 18, wherein said apparatus comprises a plurality of said units aligned such that each of said conduits runs the length of said apparatus.

20. An apparatus as claimed in claim 19, wherein said spacer element comprises two perforated plates, each of which plates is in supporting contact with the nonactive surface of a membrane (B), and separating means for separating said plates from each other.

21. An apparatus as claimed in claim 19, wherein each said spacer element supports two membranes having nonactive surfaces, respectively, that contact said spacer element.

22. An apparatus as claimed in claim 1, further comprising means for applying a vacuum to the nonactive surface of each of said membranes.

* * * * *